US008340092B2

United States Patent
Kaganoi et al.

(10) Patent No.: US 8,340,092 B2
(45) Date of Patent: Dec. 25, 2012

(54) SWITCHING SYSTEM AND METHOD IN SWITCHING SYSTEM

(75) Inventors: Teruo Kaganoi, Funabashi (JP); Takeshi Aimoto, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 1254 days.

(21) Appl. No.: 11/831,073

(22) Filed: Jul. 31, 2007

(65) Prior Publication Data

US 2008/0123622 A1     May 29, 2008

(30) Foreign Application Priority Data

Nov. 29, 2006    (JP) ................................. 2006-321464

(51) Int. Cl.
*H04L 12/28*      (2006.01)
(52) U.S. Cl. .................. 370/389; 370/392; 370/401
(58) Field of Classification Search .......... 370/352, 370/389, 392, 401
See application file for complete search history.

(56) References Cited

U.S. PATENT DOCUMENTS

| | | | | |
|---|---|---|---|---|
| 7,292,569 B1 * | 11/2007 | Smith et al. | ........... | 370/383 |
| 2002/0163884 A1 * | 11/2002 | Peles et al. | ........... | 370/229 |
| 2004/0131059 A1 * | 7/2004 | Ayyakad et al. | ........... | 370/389 |
| 2005/0076228 A1 * | 4/2005 | Davis et al. | ........... | 713/188 |
| 2006/0095968 A1 * | 5/2006 | Portolani et al. | ........... | 726/23 |

FOREIGN PATENT DOCUMENTS

| | | | |
|---|---|---|---|
| JP | 2005-005927 | | 1/2005 |
| JP | 2005005927 | * | 1/2005 |

* cited by examiner

*Primary Examiner* — Chirag Shah
*Assistant Examiner* — Jenkey Van
(74) *Attorney, Agent, or Firm* — Brundidge & Stanger, P.C.

(57) ABSTRACT

A switching system includes a data collection device, one or more switching devices. The data collection device is for collection of first data subject to specific processing. The switching devices directly or indirectly connected to the data collection device. At least one of the switching devices includes a determination module that determines whether received data is the first data or is second data which is not subject to the specific processing, and a marking module that puts first marking on the received data determined to be the first data. The switching devices respectively includes a transferring processor that executes a first transfer process for sending the received data to the data collection device when the received data has the first marking, and a second transfer process that sends the received data to the specified destination when the received data does not have the first marking.

14 Claims, 17 Drawing Sheets

Fig.4

ROUTING TABLE 135a

| | VPN-ID | DIP | NEXT TRANSFER DESTINATION |
|---|---|---|---|
| SECOND PATH INFORMATION | 0 | IP_A | 100b |
| | 0 | IP_B | 100c |
| FIRST PATH INFORMATION | 1 | any | 200 |

ROUTING TABLE 135b

| | VPN-ID | DIP | NEXT TRANSFER DESTINATION |
|---|---|---|---|
| SECOND PATH INFORMATION | 0 | IP_A | TERMINAL A |
| | 0 | IP_B | 100c |
| FIRST PATH INFORMATION | 1 | any | 100a |

ROUTING TABLE 135c

| | VPN-ID | DIP | NEXT TRANSFER DESTINATION |
|---|---|---|---|
| SECOND PATH INFORMATION | 0 | IP_A | 100b |
| | 0 | IP_B | TERMINAL B |
| FIRST PATH INFORMATION | 1 | any | 100a |

Fig.5

ACL TABLE 136b

| RULE | ACTION |
|---|---|
| SIP=0.0.0.0 | MARKING |
| DIP=128.12.24.34/4;SPORT=3 | MARKING |
| SPORT=15;DPORT=4 | MARKING |
| ⋮ | ⋮ |

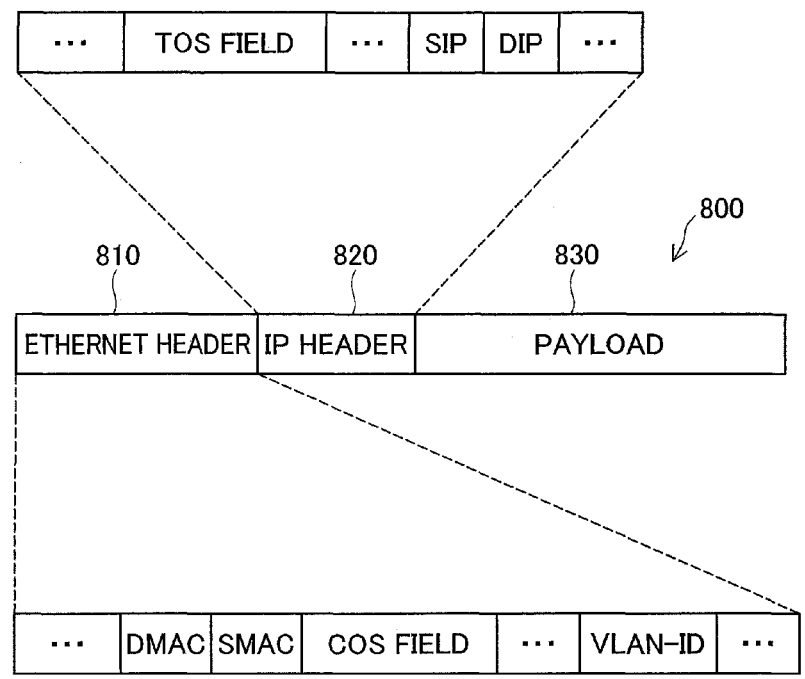

MAC ADDRESS TABLE137a

| | VLAN-ID | DMAC | SENDING PORT |
|---|---|---|---|
| SECOND PATH INFORMATION | 0 | MAC_A | P1 |
| | 0 | MAC_B | P2 |
| FIRST PATH INFORMATION | 1 | any | P3 |

MAC ADDRESS TABLE137b

| | VLAN-ID | DMAC | SENDING PORT |
|---|---|---|---|
| SECOND PATH INFORMATION | 0 | MAC_A | P1 |
| | 0 | MAC_B | P2 |
| FIRST PATH INFORMATION | 1 | any | P3 |

MAC ADDRESS TABLE137c

| | VLAN-ID | DMAC | SENDING PORT |
|---|---|---|---|
| SECOND PATH INFORMATION | 0 | MAC_A | P1 |
| | 0 | MAC_B | P2 |
| FIRST PATH INFORMATION | 1 | any | P3 |

Fig.17

ROUTING TABLE 135a

| | VPN-ID | DIP | NEXT TRANSFER DESTINATION |
|---|---|---|---|
| SECOND PATH INFORMATION | 0 | IP_A | 100b |
| | 0 | IP_B | 100d |
| FIRST PATH INFORMATION | 1 | any | 200a |
| | 2 | any | 100d |
| | 3 | any | 100d |

ROUTING TABLE 135b

| | VPN-ID | DIP | NEXT TRANSFER DESTINATION |
|---|---|---|---|
| SECOND PATH INFORMATION | 0 | IP_A | TERMINAL A |
| | 0 | IP_B | 100c |
| FIRST PATH INFORMATION | 1 | any | 100a |
| | 2 | any | 100a |
| | 3 | any | 100c |

ROUTING TABLE 135c

| | VPN-ID | DIP | NEXT TRANSFER DESTINATION |
|---|---|---|---|
| SECOND PATH INFORMATION | 0 | IP_A | 100b |
| | 0 | IP_B | 100d |
| FIRST PATH INFORMATION | 1 | any | 100d |
| | 2 | any | 100d |
| | 3 | any | 200c |

ROUTING TABLE 135d

| | VPN-ID | DIP | NEXT TRANSFER DESTINATION |
|---|---|---|---|
| SECOND PATH INFORMATION | 0 | IP_A | 100a |
| | 0 | IP_B | TERMINAL B |
| FIRST PATH INFORMATION | 1 | any | 100a |
| | 2 | any | 200b |
| | 3 | any | 100c |

Fig.18

ACL TABLE 136b

| RULE | ACTION |
|---|---|
| SIP=0.0.0.0<br>DIP=128.12.24.34/4;SPORT=3<br>SPORT=15;DPORT=4<br>⋮ | MARKING1<br>MARKING1<br>MARKING1<br>⋮ |

ACL TABLE 136c

| RULE | ACTION |
|---|---|
| SIP=224.1.1.1<br>DIP=128.13.22.34/4;SPORT=15<br>⋮ | MARKING 3<br>MARKING 3<br>⋮ |

ACL TABLE 136d

| RULE | ACTION |
|---|---|
| SIP=255.255.255.255<br>SPORT=21;DPORT=8<br>⋮ | MARKING2<br>MARKING2<br>⋮ |

Fig.20

ACL TABLE 136b

| RULE | ACTION |
|---|---|
| SIP=0.0.0.0 | MARKING1 |
| DIP=128.12.24.34/4;SPORT=3 | MARKING1 |
| SPORT=15;DPORT=4 | MARKING1 |
| SIP=255.255.255.255 | MARKING2 |
| SPORT=21;DPORT=8 | MARKING2 |
| SIP=224.1.1.1 | MARKING3 |
| DIP=128.13.22.34/4;SPORT=15 | MARKING3 |
| ⋮ | ⋮ |

SWITCHING SYSTEM AND METHOD IN SWITCHING SYSTEM

CROSS REFERENCE TO RELATED APPLICATIONS

This application relates to and claims priority from Japanese Patent Applications No. 2006-321464, filed on Nov. 29, 2006, the entire disclosure of which is incorporated by reference.

BACKGROUND

1. Technical Field

The present invention relates to a switching system, and to a method in a switching system.

2. Description of the Related Art

For networks such as the internet or the like, actions that attack the network apparatus or server system by sending abnormal data via network are a danger. To deal with this kind of danger, disclosed is a switching system for which networks are mutually connected, and when the presence of the possibility of abnormal data is detected, the data with this possibility is transferred to an inspection device that checks whether or not this data is abnormal data.

However, with the technology noted above, there is no disclosure regarding how data which is possibly abnormal is specifically transferred to an inspection device. In this way, there is no establishment of technology that efficiently transfers data which is possibly abnormal to the inspection device. Because of this, to transfer data which is possibly abnormal to the inspection device, there was the risk that a large amount of time and resources are required, and there was the risk of wastefully using circuit bandwidth. Note that this kind of problem is not limited to when transferring data which is possibly abnormal to the inspection device, but is a problem that is common when transferring data subject to specific processing to a data collection device.

SUMMARY

An advantage of some aspects of the invention is, in a switching system, to efficiently transfer data subject to specific processing to a collection device such as an inspection device.

A first aspect of the present invention provides a switching system for transferring data, the data including destination information specifying the destination. The switching system pertaining to the first aspect comprises a data collection device in which first data is collected and one or more switching devices directly or indirectly connected to the data collection device. The first data is subject to specific processing among the data. At least one of the one or more switching devices comprises a determination module, a marking module. The determination module determines whether received data is the first data or is second data which is not subject to the specific processing. The marking module puts first marking on the received data determined to be the first data. The one or more switching devices respectively comprises a transferring processor. The transferring processor executes a first transfer process for sending the received data to the data collection device when the received data has the first marking. The transferring processor executes a second transfer process that sends the received data to the specified destination when the received data does not have the first marking.

According to the switching system pertaining to the first aspect, first marking is putted on the data subject to specific processing, and each switching device executes different transfer process according to the presence or absence of the first marking. As a result, all of the switching devices are not required to determine whether or not received data is subject to a specific process, and it is possible to efficiently transfer data that is subject to specific processing to the data collection device.

In the switching system pertaining to the first aspect, the one or more switching devices may respectively further comprise a storage that stores first path information and second path information. The transferring processor may reference the first path information to execute the first transfer process. The transferring processor may reference the second path information to execute the second transfer process. In this case, each switching device has first path information in advance for transferring data having first marking, so it is possible to transfer data that having first marking to the data collection device rapidly.

In the switching system pertaining to the first aspect, the first path information may include a plurality of types of path information to transfer data to each of the data collection devices. In this case, it is possible to promptly transfer data that has first marking to each data collection device.

In the switching system pertaining to the first aspect, a plurality of types of the first marking corresponding to the plurality of types of path information included in the first path information may be used. The transferring processor, among the plurality of types of path information, may reference path information corresponding to the first marking type on the received data to execute the first process. In this case, it is possible to transfer data that has first marking to any of the plurality of data collection devices promptly according to the first marking type.

In the switching system pertaining to the first aspect, the first path information may be set statically. In this case, it is possible to freely set the first path information to match the arrangement of the data collection device for the switching system, so it is possible to optimally arrange the data collection device within the switching system.

In the switching system pertaining to the first aspect, the one or more switching devices may be layer 3 switches. The transferring processor may execute the first transfer process and the second transfer process by handling data having the first marking and data not having the first marking as data belonging to different virtual private networks. In this case, using the mechanism of a virtual private network, it is possible to easily transfer data that has first marking to a data collection device.

In the switching system pertaining to the first aspect, the first marking may be putted on a network layer header or on a data link layer header. In this case, it is possible to suppress the increase in data volume due to first marking, so it is possible to suppress wasteful use of communication bandwidth for marking.

In the switching system pertaining to the first aspect, the one or more switching devices may be layer 2 switches. The transferring processor may execute the first transfer process and the second transfer process by handling data having the first marking and data not having the first marking as data belonging to different virtual local area networks. In this case, using the mechanism of a virtual local area network, it is possible to easily transfer data that has first marking to a data collection device.

In the switching system pertaining to the first aspect, the first data may be data which is possibly abnormal. The specific process may be process of judging whether or not the first data is abnormal. In this case, it is possible to efficiently transfer data which is possibly abnormal to a data collection device.

In the switching system pertaining to the first aspect, the data collection device may comprise an inspection module that inspects the gathered first data and judges whether or not the first data is abnormal. The data collection device may remove the first marking from the first data judged to not be abnormal and sends the first data judged not to be abnormal to any one of the one or more switching devices. In this case, as a result of inspection, for data that is not abnormal, it is possible to correctly transfer this to the specified destination.

In the switching system pertaining to the first aspect, the data collection device may remove the first marking from the first data judged to not be abnormal and also put a second marking on the first data judged to not be abnormal. The second marking indicates that data having the second marking is not abnormal. In this case, it is possible for each switching device to be aware that the concerned data is not abnormal and to proceed with processing.

A second aspect of the present invention provides a method in a switching system for transferring data, the data including destination information specifying the destination, the system includes a data collection device for gathering first data among the data being subject to specific processing and one or more switching devices directly or indirectly connected to the data collection device. The method pertaining to the second aspect comprises, in at least one of the one or more switching devices, determining whether received data is the first data or is second data which is not subject to the specific processing, and putting first marking on the received data determined to be the first data. The method pertaining to the second aspect also comprises, in each of the one or more switching devices, executing a first transfer process for sending the received data to the data collection device when the received data has the first marking, and executing a second transfer process that sends the received data to the specified destination when the received data does not have the first marking.

According to the method pertaining to the second aspect, the similar functions and effects as the switching system pertaining to the first aspect may be obtained. In addition, the method pertaining to the second aspect may also be actualized in a variety of aspects in a way similar to the switching system pertaining to the first aspect.

The present invention can be realized in various aspects, for example, a switching devices included in the switching system of the first aspect, or a data collection device of the first aspect. The invention can also be realized as a computer program used to realize functions of the method of the second aspect, functions of the switching system of the first aspect, functions of the switching devices included in the switching system of the first aspect; as a recording medium having such a computer program recorded thereon.

The above and other objects, characterizing features, aspects and advantages of the invention will be clear from the description of preferred embodiments presented below along with the attached Figures.

BRIEF DESCRIPTION OF THE DRAWINGS

FIG. 4 is a drawing that conceptually shows the routing table stored in each switching device with the embodiment;

FIG. 5 is a drawing conceptually showing an example of an ACL table stored in a second switching device with the embodiment;

FIG. 6 is a drawing conceptually showing the Ethernet frame data constitution;

FIG. 17 is a drawing conceptually showing the routing table stored in each switching device in the fifth Variation;

FIG. 18 is a drawing conceptually showing an example of the ACL table stored in each switching device in the fifth Variation;

FIG. 20 is a drawing conceptually showing a different example of the ACL table for the switching system of the fifth Variation.

DETAILED DESCRIPTION OF THE PREFERRED EMBODIMENTS

Embodiments of the present invention will be described below with reference to the drawings.

A. Embodiments

Constitution of Switching System

Figure 1:
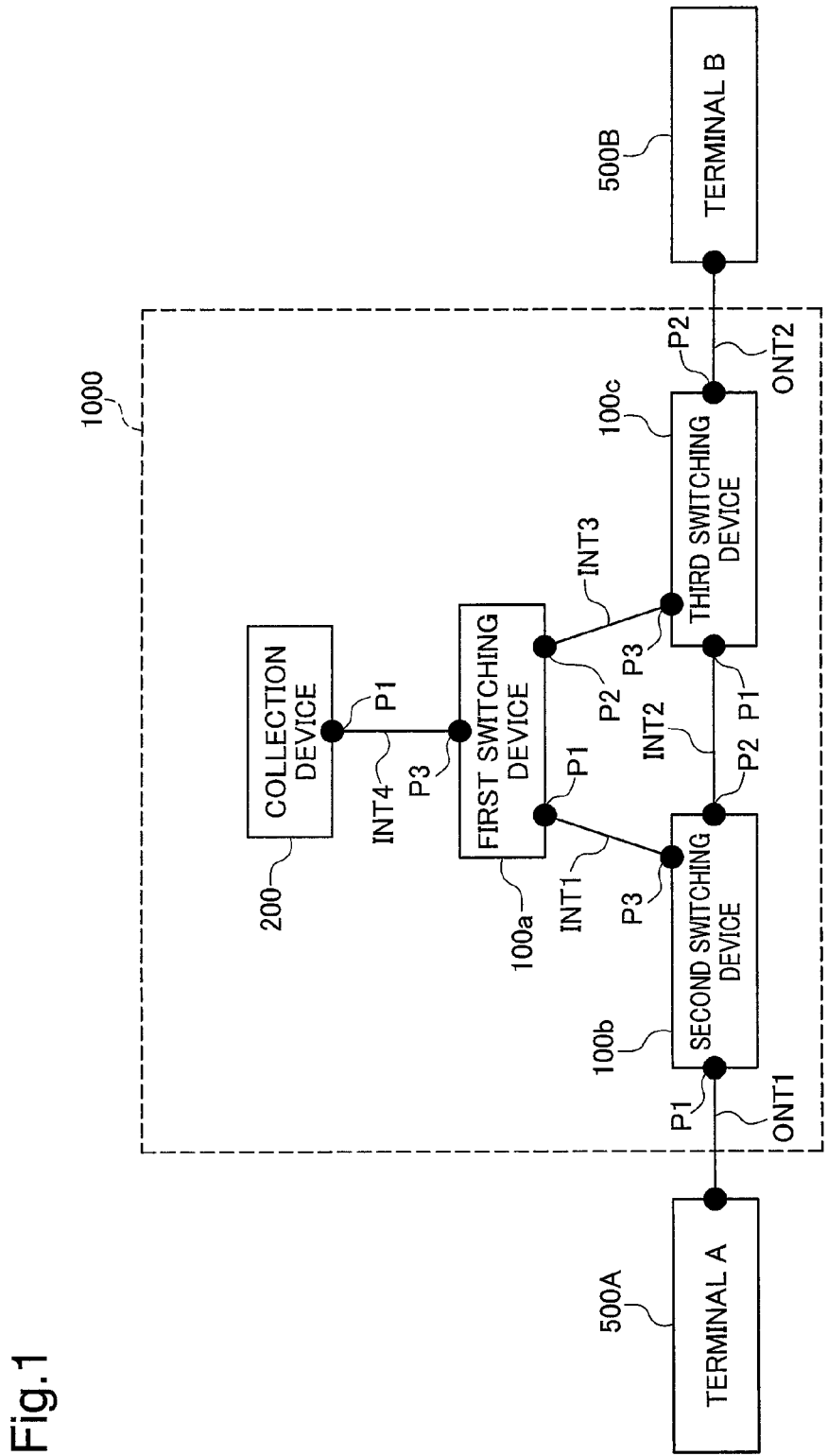
FIG. 1 is a block diagram showing the schematic constitution of the switching system of the embodiment.
Figure 2:
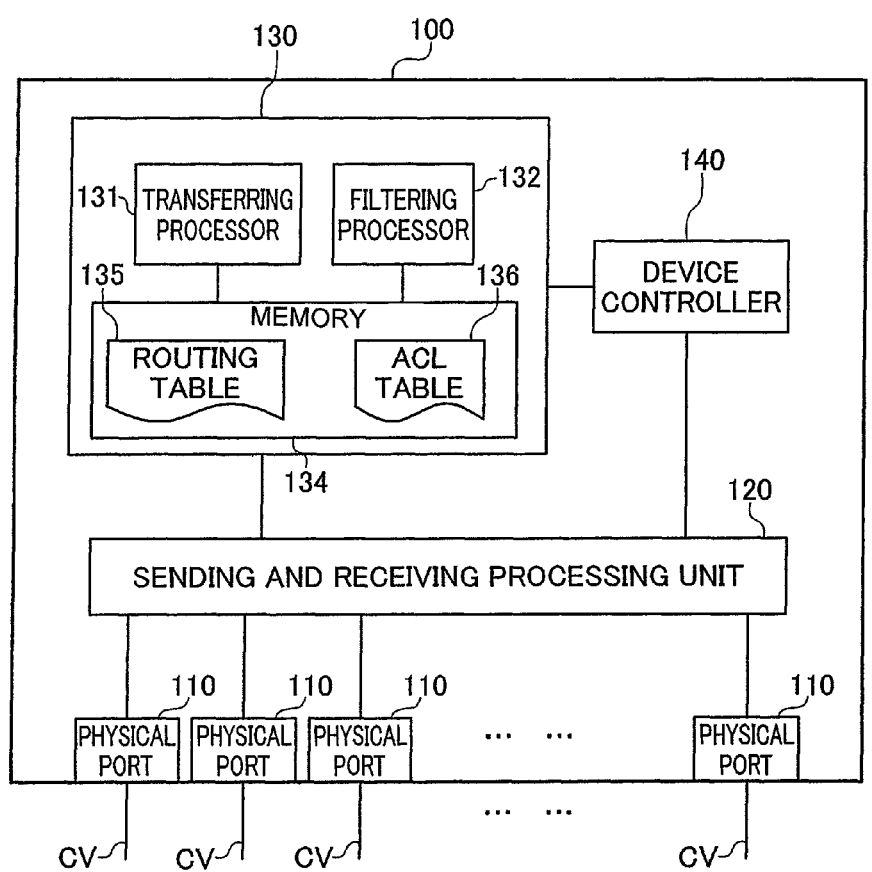
FIG. 2 is a block diagram showing the internal constitution of a switching device included in the switching system of the embodiment.
Figure 3:
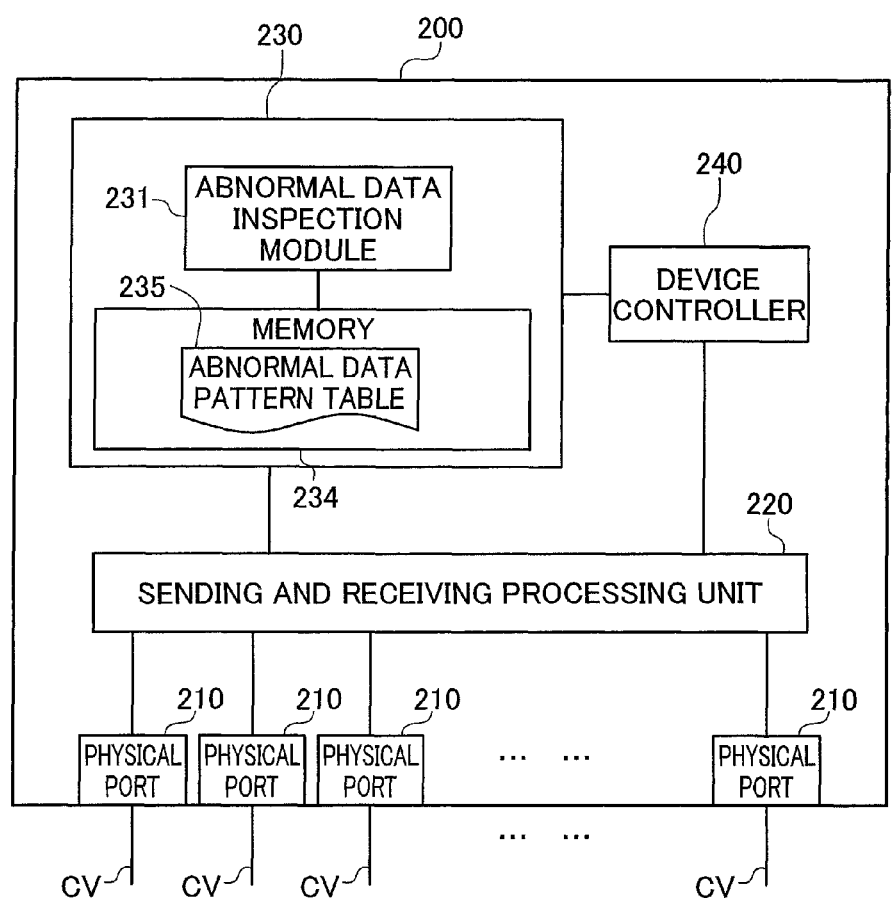
FIG. 3 is a block diagram showing the internal constitution of the collection device 200 included in the switching system of the embodiment.

Referring to FIG. 1 to FIG. 4, the constitution of the switching system of the embodiment is described. FIG. 1 is a block diagram showing the schematic constitution of the switching system of the embodiment. FIG. 2 is a block diagram showing the internal constitution of a switching device included in the switching system of the embodiment. FIG. 3 is a block diagram showing the internal constitution of the collection device 200 included in the switching system of the embodiment. FIG. 4 is a drawing that conceptually shows the routing table stored in each switching device with the embodiment. FIG. 5 is a drawing conceptually showing an example of an ACL table stored in a second switching device with the embodiment. FIG. 6 is a drawing conceptually showing the Ethernet frame data constitution.

As shown in FIG. 1, the switching system 1000 of this embodiment includes three switching devices, specifically, a first switching device 100a, a second switching device 100b, and a third switching device 100c. Following, when it is not necessary to distinguish between the three switching devices, the alphabet code ending will be omitted, and this will be noted as switching device 100. Furthermore, the switching system 1000 includes a collection device 200.

As shown in FIG. 2, the switching device 100 includes a plurality of physical ports 110, a sending and receiving processor 120, a frame processor 130, and a device controller 140.

The physical port 110 is an interface for connecting to the network via a communication link CV such as a coaxial cable, an optical fiber. With this embodiment, the physical port 110 is a port that complies with the Ethernet (trademark) standard.

The sending and receiving processor 120 is connected to each physical port 110, interprets the electrical signals received via the physical port 110, and performs the receiving process of converting these to consolidations of data used with the data link layer. The consolidations of data are called frames hereafter. With this embodiment, these are Ethernet (trademark) frame). The sending and receiving processor 120 sends the converted Ethernet frames to the frame processor 130. Also, the sending and receiving processor 120 performs the sending process of receiving the Ethernet frames to be transferred from the frame processor 130, and converting the Ethernet frames to electrical signals and sending them from the corresponding port as described later.

Here, the Ethernet frame is described while referring to FIG. 6. The Ethernet frame 800 includes a payload 830, an IP header 820, and an Ethernet header 810. The payload 830 is the data itself that is subject to transfer. The IP header 820 is the header on which is noted the information used for processing at the network layer. The IP header 820, as shown in FIG. 6, includes a TOS (Type of Service) field, a source IP address (hereafter also called SIP), and a destination IP address (hereafter also called DIP). In the TOS field is noted, for example, information that specifies the IP packet type, such as information specifying the priority level of that IP packet. The Ethernet header 810 includes a destination MAC address (hereafter also called DMAC), a source MAC address (hereafter also called SMAC), a COS (Class of Service) field, and a VLAN-ID. The COS field and the VLAN-ID are sometimes omitted.

The frame processor 130 includes a transferring processor 131, a filtering processor 132, and a memory 134. Stored in the memory 134 are the routing table 135 and an ACL (Access Control List) table 136. The routing table 135 is a table in which is noted information that correlates the destination IP address and the transfer destination device. The ACL table 136 is the table used when the filtering processor 132 filters the Ethernet frames. The ACL table 136 does not have to be set for all the switching devices 100, and is not set in some cases. The routing table 135 and the ACL table 136 will be described more later.

The transferring processor 131 and the filtering processor 132 are ASIC (Application Specific Integrated Circuit) designed to realize the function of this circuit described later, and the functions of this circuit described later are executed by hardware processing. The transferring processor 131 is a circuit that performs transfer process for transferring Ethernet frames received from the sending and receiving processor 120. Specifically, the transferring processor 131 specifies the transfer destination device to transfer the Ethernet frame to based on the destination IP address included in the concerned Ethernet frame. As described later, specification of the transfer destination device is executed by referencing the routing table 135 which is stored in the memory 134. The transferring processor 131 further specifies the MAC address of the specified transfer destination device, and also specifies the corresponding port for transferring the Ethernet frame to the specified transfer destination device. These MAC address and corresponding port specification are executed by referencing the ARP table (not illustrated) in which is described the information correlating the transfer destination device MAC address and the corresponding port. The transferring processor 131 converts the destination MAC address included in the Ethernet frame to the MAC address of the specified transfer destination device, and sends the Ethernet frame to the sending and receiving processor 120 specifying the specified corresponding port. As a result, the Ethernet frame is transferred from the corresponding port to the transfer destination device. The transfer performed by specifying the corresponding port using the transferring processor 131 is performed based on the IP address which is the address of the network layer which is the third layer of the OSI (Open Systems Interconnection) reference model, so hereafter, this is called layer 3 transfer.

When the ACL table 136 described above is set, the filtering processor 132 references the ACL table 136, and performs Ethernet frame filtering. Also, the filtering processor 132 performs marking described later on the Ethernet frame that matches the conditions described in the ACL table 136.

The device controller 140 does overall control of the switching device 100. The device controller 140 is a well known computer, and by executing a control program, realizes a function as a device controller. The device controller 140 executes the function of performing processing of a routing protocol such as RIP (Routing Information Protocol), OSPF (Open Shortest Path First) or the like, the function of creating a routing table and storing it in the memory 134 of the frame processor 130, and the like.

The collection device 200 is a device in which Ethernet frames are collected which could possibly be abnormal data (hereafter called first Ethernet frames), and is for checking whether or not the gathered first Ethernet frames are actually abnormal data. The collection device 200 has a constitution similar to that of the switching device 100. As shown in FIG. 3, the collection device 200 includes a plurality of physical ports 210, the sending and receiving processor 220, the frame inspection circuit 230, and the device controller 140.

The physical port 210 is the same as the physical port 110 of the switching device 100, so its description is omitted.

The sending and receiving processor 220, the same as the sending and receiving processor 120 of the switching device 100, interprets the electrical signals received via the physical port 210, converts them to Ethernet frames, and sends them to the frame inspection circuit 230. Also, the sending and receiving processor 120 performs the sending process of receiving the Ethernet frames to be transferred from the frame inspection circuit 230, and converting the Ethernet frames to electrical signals and sending them from the corresponding port.

The frame inspection circuit 230 includes an abnormal data inspection module 231 and a memory 234. An abnormal data pattern table 235 is stored in the memory 234. In the abnormal data pattern table 235, the features of abnormal Ethernet frames such as the features of malicious codes, for example, a Trojan horse and viruses, and frame patterns for DDOS (Distributed Denial of Service) attacks.

The abnormal data inspection module 231, the same as the transferring processor 131 of the switching device 100, is an ASIC designed to realize the function of this circuit. The abnormal data inspection module 231 checks the contents of the first Ethernet frame received from the sending and receiving processor 220, and judges whether or not the first Ethernet frames are abnormal Ethernet frames. Also, as described later, the abnormal data inspection module 231 performs discarding of the first Ethernet frames judged to be abnormal Ethernet frames, and removing the marking of the first Ethernet frames judged to not be abnormal Ethernet frames and retransferring those.

The device controller 240 does overall control of the collection device 200. The device controller 240 is a well known computer, and realizes a function as a device controller by executing a control program. The device controller 240 executes updating of the abnormal data pattern table 235, for example.

Returning to FIG. 1, we will continue the description. In FIG. 1, the black dots indicate the ports that each device includes. For example, the ports P1 to P3 of each of the switching devices 100a to 100c correspond to one of the physical ports 110 in FIG. 2, and the port P1 of the collection device 200 corresponds to one of the physical ports in FIG. 3.

As shown in FIG. 1, of the three switching devices 100 included in the switching system 1000, the port P1 of the first switching device 100a is connected with the system external terminal 500A (terminal A) via an outside network ONT1. Similarly, the port P2 of the third switching device 100c is connected with the system external terminal 500B (terminal B) via the outside network ONT2. Instead of the terminals 500A and 500B, it is also possible to connect with a known router or switch.

The port P1 of the first switching device 100a and the port P3 of the second switching device 100b, the port P2 of the second switching device 100b and the port P1 of the third switching device 100c, and the port P2 of the first switching device 100a and the port P3 of the third switching device 100c are respectively connected via internal networks INT1, INT2, and INT3. Also, the port P3 of the first switching device 100a is connected with the port P1 of the collection device 200 via the internal network INT4. In this way, the first switching device 100a is directly connected with the collection device 200. Meanwhile, the second switching device 100b and the third switching device 100c are connected with the collection device 200 indirectly, specifically, via another of the one or more switching devices (with this embodiment, via the first switching device 100a).

Next, referring to FIG. 4, the contents of the routing table 135 stored in each of the switching device 100 will be described. The routing tables stored respectively in the first switching device 100a, the second switching device 100b, and the third switching device 100c are represented by the codes 135a, 135b, and 135c. As shown in FIG. 4, path information indicating the correlation between the destination IP address and the next transfer destination is described in the routing tables 135a, 135b, and 135c. As the transfer destination, actually, the IP address of a port for a next transfer as the next transfer destination is often described, but with FIG. 4, the code of the device of the next transfer destination is described for easier understanding. As shown in FIG. 4, each routing table 135a to 135c respectively includes two types of path information for two virtual private networks (VPN). Specifically, there is first path information for VPN having an identifier ID1 and a second path information for VPN having an identifier ID0.

The first path information is special path information described so as to have Concerned Ethernet frames transferred to the collection device 200 regardless of the destination IP address. The first path information is set statically by the system administrator, for example.

The second path information is normal path information described so as to have transfer ultimately done to the device having the destination IP address, according to the destination IP address. In FIG. 4, IP_A expresses the IP address of the terminal 500A, and IP_B indicates the IP address of the terminal 500B. The second path information can be set statically, or it an also be set dynamically using various routing protocols.

Next, referring to FIG. 5, the ACL table 136 will be described. The ACL table 136 is not required to be set for all the switching devices 100a to 100c as described previously, and with this embodiment, is set only for the second switching device 100b. In FIG. 5, the ACL table 136b set for the second switching device 100b is shown. The ACL table 136b includes entries describing rules (conditions), and entries describing actions performed when those rules are matched. In the entries describing rules, described are rules for determining the Ethernet frames which are possibly abnormal. In the described rules, for example, there is the fact that the send source IP address (SIP) is an item used as the false source IP address (e.g. 0.0.0.0 or a broadcast address or the like), that the destination IP address (DIP) is a specific address (e.g. the IP address of the server that frequently receives DDoS attacks). The described rules may also indicate that this is a frame for which access is not allowed (e.g. description of a rule using a destination IP address and a source IP address), that this is a frame for which a DDoS attack is possible (e.g. a frame using ICMP), that this is a specific application destination or a frame from a specific application (e.g. description of a rule with a TCP header send source port number, destination port number). Then, the actions performed when these rules are matched are described with marking with this embodiment. Marking is described later.

Figure 7:
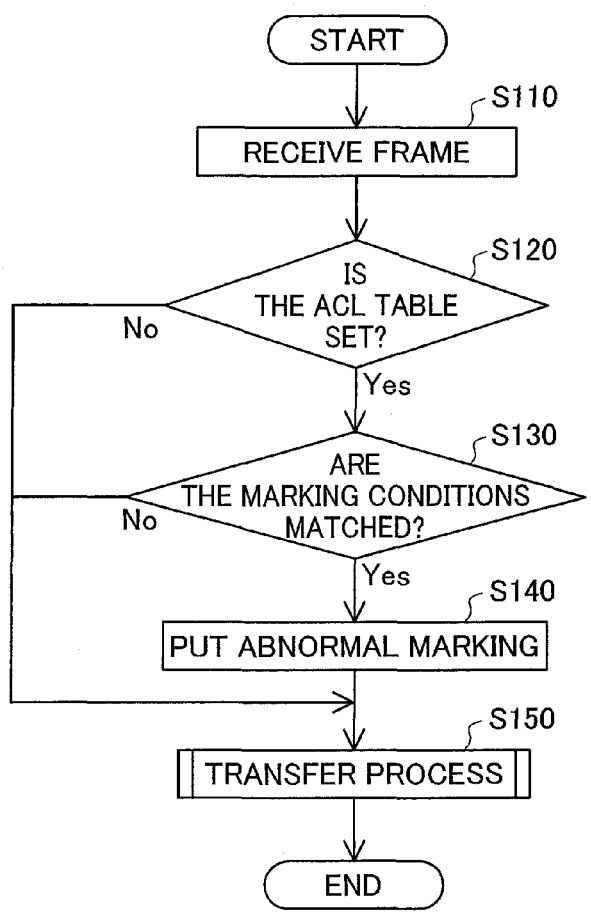
FIG. 7 is a flow chart showing the operation steps of each switching device.
Figure 8:
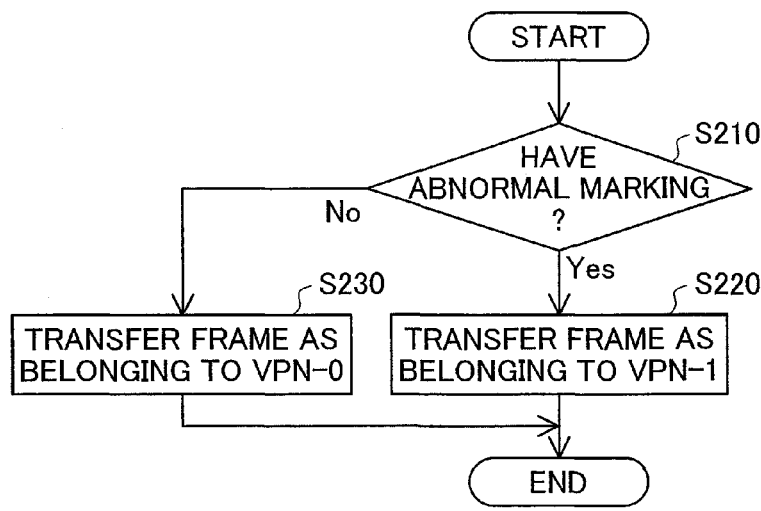
FIG. 8 is a flow chart showing the process steps of the transfer process with each switching device.
Figure 9:
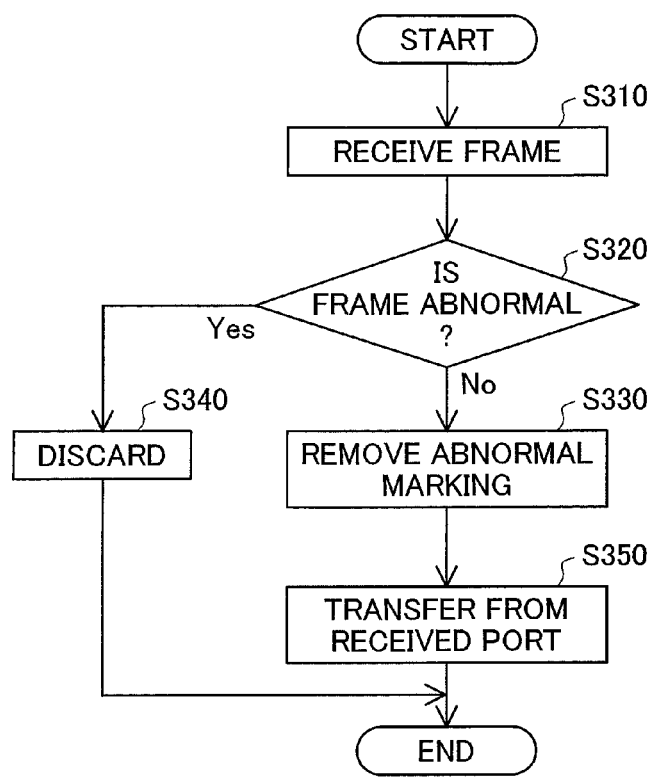
FIG. 9 is a flow chart showing the operation steps of the collection device.
Figure 10:
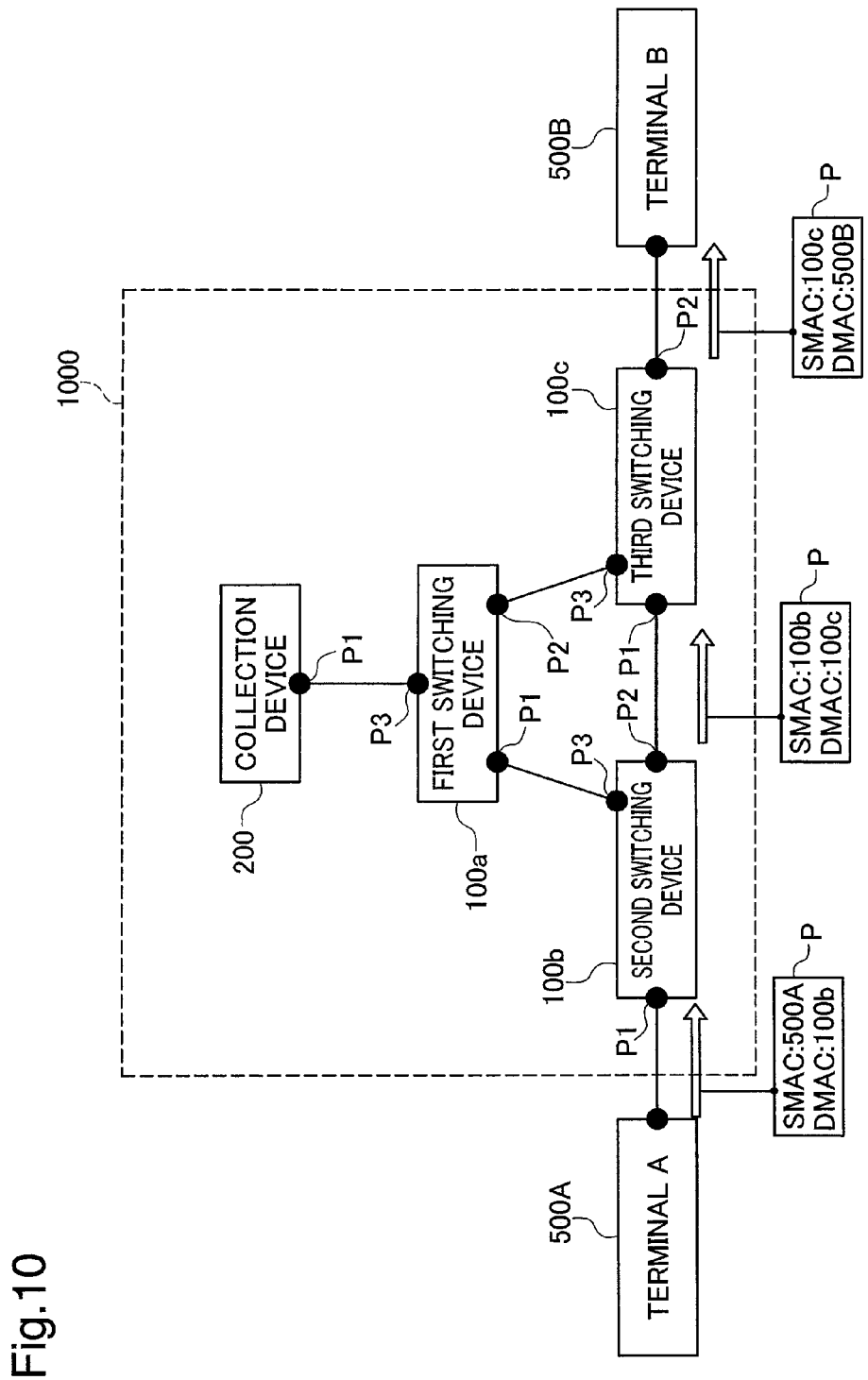
FIG. 10 is a first drawing showing an operation example of the switching system of the embodiment.
Figure 11:
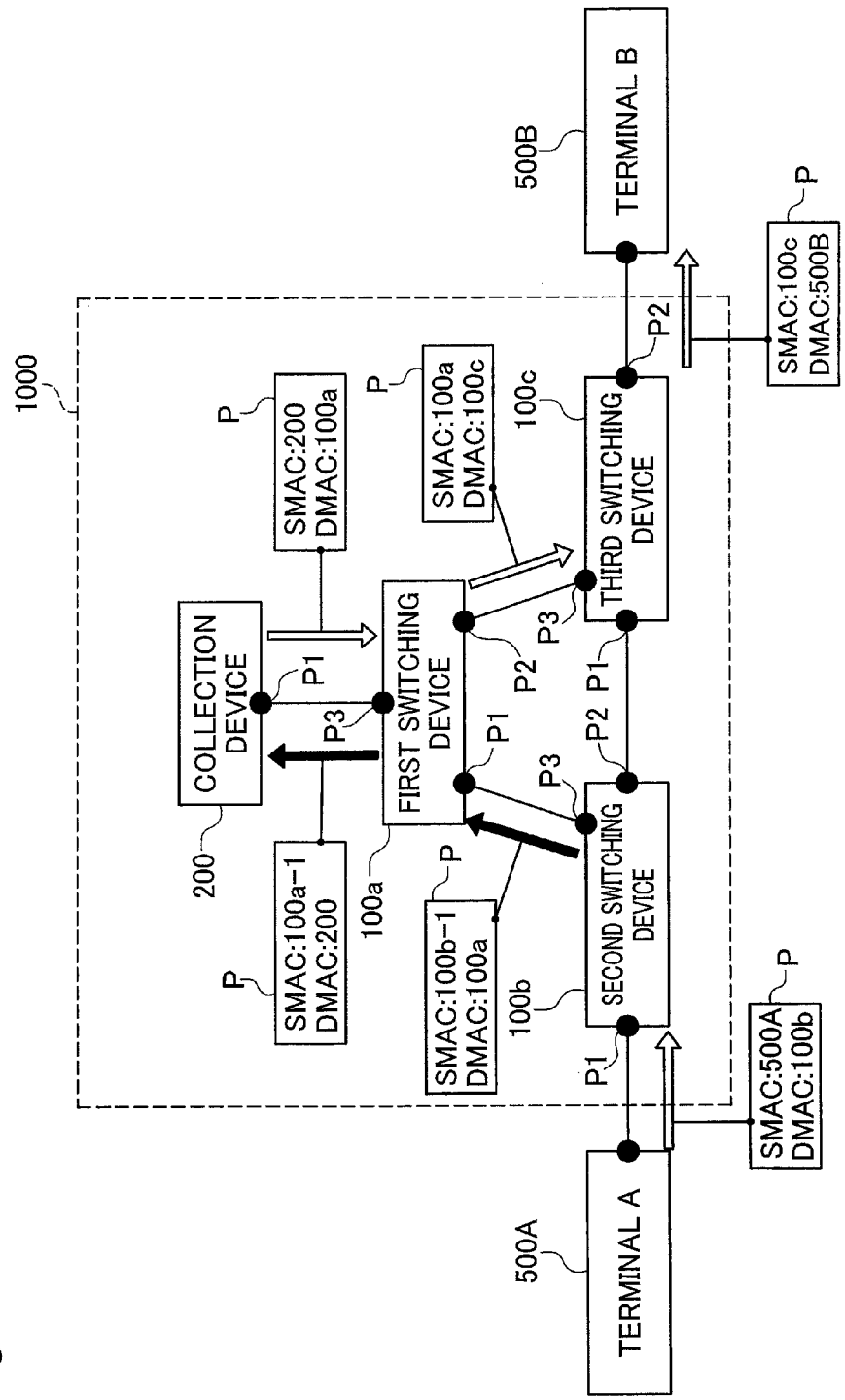
FIG. 11 is a second drawing showing an operation example of the switching system of the embodiment.

Switching System Operation:

Referring to FIG. 7 through FIG. 11, the operation of the switching system 1000 will be described. FIG. 7 is a flow chart showing the operation steps of each switching device. FIG. 8 is a flow chart showing the process steps of the transfer process with each switching device. FIG. 9 is a flow chart showing the operation steps of the collection device. FIG. 10 is a first drawing showing an operation example of the switching system of the embodiment. FIG. 11 is a second drawing showing an operation example of the switching system of the embodiment.

First, the operation of each switching device 100a to 100c will be described. The operation is the same for any of the switching devices 100a to 100c, so the alphabet letter distinguishing each switching device will be omitted and we will describe this as the operation of the switching device 100. As shown in FIG. 7, the switching device 100 receives the Ethernet frame with the MAC address corresponding to the switching device 100 itself as the destination via any of the physical ports 110 (step S110). When the Ethernet frame is received, at the frame processor 130 of the switching device 100, the filtering processor 132 judges whether or not the ACL table 136 is set in the memory 134 (step S120). When the ACL table 136 is not set (step S120: No), the process moves to transfer process by the transferring processor 131 of the frame processor 130 (step S150).

Meanwhile, when it is judged that the ACL table 136 is set in the memory 134 (step S120: Yes), a determination is made of whether the received Ethernet frame matches the marking conditions (step S130). Specifically, the filtering processor 132 determines whether or not this frame matches rules described in the ACL table 136 described in reference to FIG. 5.

When it is determined that the received Ethernet frame does not match the marking conditions (step S130: No), the process moves to the transfer process by the transferring processor 131 of the frame processor 130 (step S150).

Meanwhile, when it is determined that the received Ethernet frame matches the marking conditions (step S130: Yes), specifically, when it is judged that the received Ethernet frame is possibly abnormal, the filtering processor 132 puts marking on the concerned Ethernet frame, the making indicating that it is possibly abnormal (hereafter called abnormal marking). With this embodiment, abnormal marking is performed by rewriting all or part of the source MAC address of the concerned Ethernet frame to a specified value. When abnormal marking is done, the process moves to the transfer process by the transferring processor 131 (step S150).

The transfer process by the transferring processor 131 is described while referring to FIG. 8. First, the transferring processor 131 judges whether or not the concerned Ethernet frame has abnormal marking (step S210). Specifically, with this embodiment, a judgment is made of whether or not a specified rewrite is performed on the source MAC address of the concerned Ethernet frame.

When the transferring processor 131 judges that the concerned Ethernet frame has abnormal marking (step S210: Yes), transfer process is performed with the concerned Ethernet frame as a frame belonging to the VPN having identifier ID1 (VPN-1) (step S220). Specifically, the transferring processor 131 performs routing of the concerned Ethernet frame according to the first path information set statically in the routing table 135 in FIG. 4, and transfers the concerned Ethernet fram. As a result, the concerned Ethernet frame is routed so as to be ultimately transferred to the collection device 200.

Meanwhile, when it is judged that the concerned Ethernet frame does not have abnormal marking (step S210: No), transfer process is performed with the concerned Ethernet frame as a frame belonging to the VPN having identifier ID0 (VPN-0) (step S230). Specifically, the transferring processor 131 performs routing of the concerned Ethernet frame according to the second path information of the normal path information in the routing table 135 in FIG. 4, and transfers the concerned Ethernet frame. As a result, the concerned Ethernet frame is routed so as to be ultimately transferred to the device having the IP address described as the destination IP address.

Next, the operation of the collection device 200 will be described while referring to FIG. 9. The collection device 200 receives the Ethernet frame having the MAC address corresponding to the collection device 200 itself as the destination via any of the physical ports 210 (step S310). Here, the Ethernet frames transferred to the collection device 200 are Ethernet frames which have abnormal markings as can be understood from the operation of the switching device 100 described above.

When the Ethernet frame is received, at the frame inspection circuit 230 of the collection device 200, the abnormal data inspection module 231 judges whether or not the concerned Ethernet frame is an abnormal Ethernet frame (step S320). In specific terms, the abnormal data inspection module 231 checks the contents of the concerned Ethernet frame, and by comparing them with the abnormal data pattern table 235 described above, judges whether or not this is an abnormal Ethernet frame.

When the abnormal data inspection module 231 judges that the concerned Ethernet frame is an abnormal Ethernet frame (step S320: Yes), it discards the concerned Ethernet frame (step S340), and the process ends.

Meanwhile, when the abnormal data inspection module 231 judges that the concerned Ethernet frame is not an abnormal Ethernet frame (step S320: No), the abnormal data inspection module 231 removes the abnormal marking from the concerned Ethernet frame (step S330). In specific terms, it rewrites the source MAC address of the concerned Ethernet frame to a normal MAC address allocated to itself.

When the abnormal marking in the concerned Ethernet frame is removed, the abnormal data inspection module 231 transfers the concerned Ethernet frame from the port which received the concerned Ethernet frame (step S350). As a result, with this embodiment, Ethernet frames from which the abnormal marking has been removed are returned from the collection device 200 to the first switching device 100a.

Incidentally, to make it easy to understand, examples of operations of the switching system 1000 are described while referring to FIG. 10 and FIG. 11. As operation examples, cases of the frame P (the frame having the destination IP address "IP_B") is sent from the terminal 500A to the terminal 500B will be described. In FIG. 10 and FIG. 11, the white arrows indicate that this is normal transfer, for example, transfer routed as frames belonging to VPN-0, specifically, transfer routed according to the second path information. Meanwhile, the black arrows indicate that this is transfer routed as frames belonging to VPN-1, specifically, transfer routed according to the first path information.

FIG. 10 shows a case when normal routing is performed at the second switching device 100b without the abnormal marking conditions of the ACL table 136b (FIG. 5) being applicable. In FIG. 10, as shown by the white arrows, abnormal marking does not be putted on the source MAC address (SMAC) of frame P, and at the second switching device 100b and the third switching device 100c, frame P routed according to the second path information (FIG. 4) and ultimately sent to the terminal B.

FIG. 11 shows a case when at the second switching device 100b, the abnormal marking conditions of the ACL table 136b (FIG. 5) are applicable, and abnormal marking is putted on frame P. In FIG. 11, the "−1" attached to the end of the source MAC address (SMAC) indicates abnormal marking. As shown in FIG. 10, abnormal marking is putted on frame P at the second switching device 100b, and at the second switching device 100b and the first switching device 100a, routing of frame P is done according to the first path information (FIG. 4) and frame P is transferred to the collection device 200. Here, when it is judged that the frame P is abnormal frame at the collection device 200, frame P is discarded at the collection device 200. Meanwhile, when it is judged that frame P is not abnormal frames at the collection device 200, as shown by the white arrows in FIG. 11, the frame P is returned to the first switching device 100a, and at the first switching device 100a and the third switching device 100c, frame P is routed according to the second path information (FIG. 4), and is ultimately sent to the terminal B.

According to the switching system 1000 of this embodiment described above, the first path information (FIG. 4) for transferring to the collection device 200 is statically set in advance to each switching device 100a to 100c, so when traffic (Ethernet frames) which is possibly abnormal is detected, it is possible to instantaneously divert the concerned traffic to the collection device 200. For example, after the possibly abnormal traffic is detected, when the constitution is made to dynamically change the routing table, the routing table of each switching device is changed, and there is the risk of a significant amount of time being required until diverting, but this embodiment does not have that kind of problem.

Furthermore, with this embodiment, abnormal marking is done on the source MAC address, so there is no wasting of bandwidth. For example, when possibly abnormal traffic is detected, when using a constitution that performs diversion by capsuling the frame included in that traffic, the data volume of the frames becomes greater by the amount of capsuling, and there is the risk of wasteful use of bandwidth, but this embodiment does not have that kind of problem.

Furthermore, the first path information for transferring to the collection device 200 (FIG. 4) can be statically set in advance in each switching device 100a to 100c according to the arrangement position of the collection device 200, it is possible to easily realize the optimal arrangement of the collection device 200.

Also, it is not necessary to set the filter for detecting possibly abnormal Ethernet frames (with this embodiment, the ACL table 136) for all the switching devices 100, and it is possible to set different filters with each switching device 100, so it is possible to effectively utilize the resources of the switching device 100. For example, when using a constitution that diverts possibly abnormal traffic to the collection device by using so-called policy routing, it becomes necessary to set filters for which the same rules are set for all the switching devices, and this is not efficient.

B. Variations

First Variation:

With the embodiment noted above, abnormal marking was putted on the source MAC address, but this is just one example, and it is possible to perform abnormal marking using various methods. For example, of the Ethernet frames 800 shown in FIG. 6, it is also possible to put abnormal marking on the TOS field of the IP header 820. For example, 8 bits are prepared for the TOS field. Among them, the final 1 bit may be used for abnormal marking. In this case, for example, the value "0" of concerned bit means there is no abnormal marking, the value "1" of concerned bit means there is abnormal marking. Also, of the Ethernet frames 800, it is also possible to perform abnormal marking on the COS field of the Ethernet header 810 or on part of the field describing the VLAN-ID. It is also possible to perform abnormal marking on the destination MAC address. Doing something like adding new data such as with capsuling invites wasteful use of bandwidth due to an increase in the data volume, so as with the various examples described above, it is preferable to do marking of an existing field.

Figure 12:
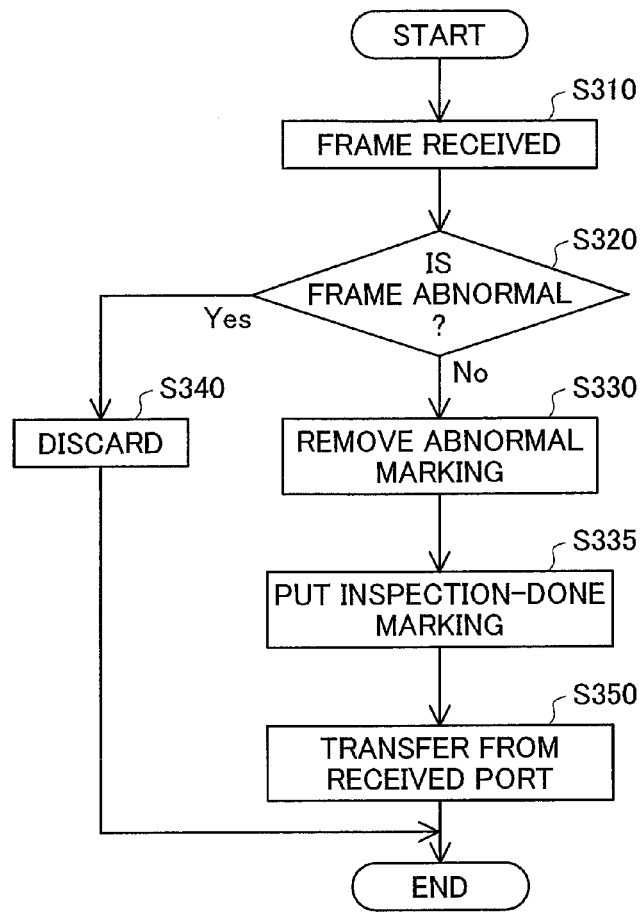
FIG. 12 is a flow chart showing the operation steps of the collection device of the second Variation.

Second Variation:

At the collection device 200, when the concerned frame is judged that this is not an abnormal Ethernet frame, the abnormal marking is only removed in the above embodiment, but in addition to this, it is also possible to put marking indicating that a check of whether or not this is abnormal has been done (hereafter called inspection-done marking). FIG. 12 is a flow chart showing the operation steps of the collection device of the second Variation. The difference point from the operation steps of the collection device with the embodiment described in FIG. 9 is only the point that step S335 for putting the inspection-done marking is added. The other steps are the same, so their description is omitted.

The inspection-done marking can be putted using various methods, the same as with the abnormal marking, for example on the TOS field of the IP header 820, or the COS field of the Ethernet header 810. The same as with abnormal marking, with inspection-done marking as well, to suppress wasteful use of bandwidth due to an increase in data volume, it is preferable to do marking on existing fields.

When doing inspection-done marking in this way, each switching device 100 does not have the Ethernet frames having the inspection-done marking as subjects of determining whether or not abnormality is possible by the filtering processor 132. Alternatively, each switching device 100 even when Ethernet frames having the inspection-done marking are determined to possibly be abnormal, abnormal marking is not putted. Alternatively, each switching device 100 does routing of the Ethernet frames marked as inspection-done according to the second path information unconditionally.

With the second Variation, it is possible to prevent an Ethernet frame that has once been judged to not be abnormal at the collection device 200 from again having abnormal marking at any of the switching devices 100, and being returned to the collection device 200. When the ACL table 136 is set for the plurality of switching devices 100 included in the switching system 1000, this Variation is particularly effective in cases such as when setting rules with overlapping content in the ACL table 136 in the plurality of switching devices 100.

Third Variation:

With the embodiment noted above, shown was an example for which three switching devices 100 were mutually connected, but the number of switching devices 100 included in the switching system can be changed freely, and it is possible to also freely change the connection state of the switching devices 100. For example, it is possible to have four switching devices 100 connected in a straight line, possible to have them connected in a ring shape, and possible to have them connected in a star shape.

Figure 13:
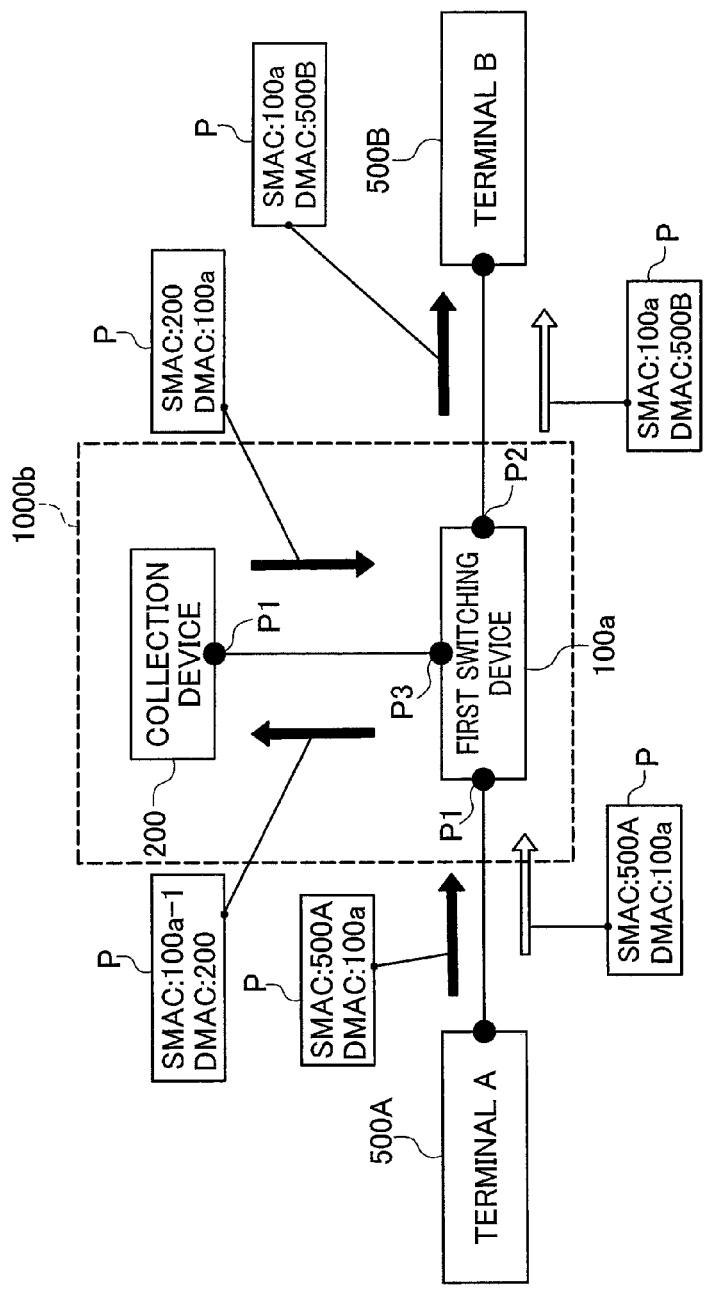
FIG. 13 is a block diagram showing the schematic constitution of the switching system of third Variation.

As a minimum constitution, a switching system 1000b only including a first switching device 100a and a collection device 200 will be described referring to FIG. 13 as a third Variation. FIG. 13 is a block diagram showing the schematic constitution of the switching system of this Variation. With this constitution, the ACL table 136 like that shown in FIG. 5 is set in the first switching device 100a. Also, the same as with the embodiment, in the first switching device 100a, the second path information which is normal path information and the first path information for transferring to the collection device 200 are described in the routing table 135.

With this kind of constitution as well, as shown by the white arrows in FIG. 13, frames for which there is no possibility of being abnormal have normal routing performed according to the second path information, and as shown by the black arrows in FIG. 13, frames for which abnormality is possible are routed so as to be diverted to the collection device 200.

Figures 14, 15:
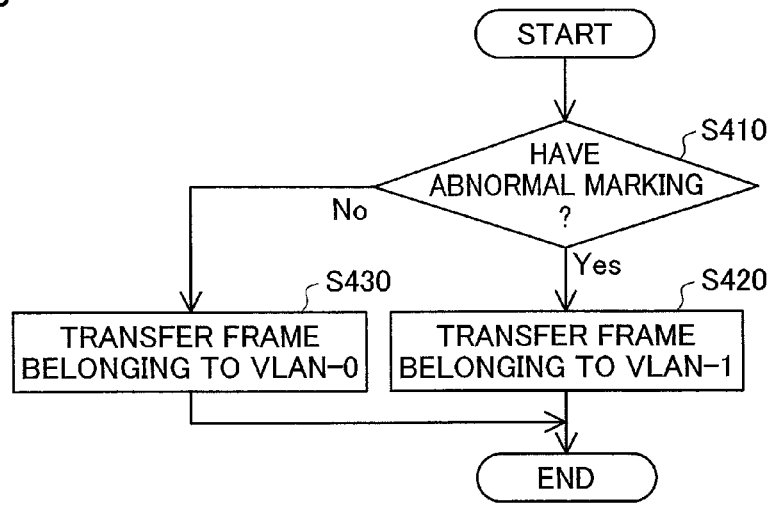
FIG. 14 is a drawing conceptually showing the MAC address table stored in the switching device in fourth Variation.
FIG. 15 is a flow chart showing the process steps of the transfer process for fourth Variation.

Fourth Variation:

With the embodiment described above, each switching device 100a to 100c is a device for performing layer 3 transfer, but the switching devices 100a to 100c can also be a layer 2 switch that performs layer 2 transfer. Referring to FIG. 14 to FIG. 15, the switching system constituted by the layer 2 switches will be described. FIG. 14 is a drawing conceptually showing the MAC address table stored in the switching device in this Variation. FIG. 15 is a flow chart showing the process steps of the transfer process for this Variation. With the switching device 100 as the layer 2 switch, instead of the routing table 135, the MAC address table 137 is stored in the memory 134 in FIG. 2.

Referring to FIG. 14, the contents of the MAC address table 137 will be described. The MAC address tables stored in the first switching device 100a, the second switching device 100b, and the third switching device 100c which are layer 2 switches are respectively represented by codes 137a, 137b, and 137c. As shown in FIG. 14, described in the MAC address tables 137a, 137b, and 137c is the path information showing the correlation between the destination MAC address and the sending port. As the sending ports, to make it easier to understand, codes are noted attached to the black dots showing the ports in FIG. 1. As shown in FIG. 14, each MAC address table 137a to 137c respectively contains two types of path information for two virtual local area networks (VLAN: Virtual Local Area Network). Specifically, these tables respectively include first path information for VLAN having identifier ID1 and second path information for VLA having identifier ID0.

The first path information is special path information described so that the concerned Ethernet frame is transferred to the collection device 200 regardless of the destination MAC address. The first path information is, for example, statically set by the system administrator.

The second path information is normal path information describing, for each destination MAC address, which port frame having the concerned destination MAC address should be sent from. In FIG. 14, MAC_A expresses the terminal 500A MAC address, and MAC_B indicates the terminal 500B MAC address. The second path information can be set statically and it can also be set by dynamic learning.

The operation of the switching device 100 as a layer 2 switch with this Variation is basically the same as the operation of the switching device 100 with the embodiment described while referring to FIG. 7. However, the abnormal marking in FIG. 7 (step S140) is putted on the COS field of the Ethernet header 810. For example, the COS field has 3 bits prepared. Among them, the final 1 bit may be used for abnormal marking. In this case, for example, the value "0" of concerned bit means there is no abnormal marking, the value "1" of concerned bit means there is abnormal marking.

Also, the transfer process of the switching device 100 as a layer 2 switch is different from the transfer process of the embodiment (FIG. 8), so this process will be described referring to FIG. 15. First, the transferring processor 131 judges whether or not the concerned Ethernet frame has abnormal marking (step S410). Specifically, with this Variation, the transferring processor 131 checks the COS field of the concerned Ethernet frame, and judges whether or not abnormal marking is putted on.

When the transferring processor 131 judges that the concerned Ethernet frame has abnormal marking (step S410: Yes), transfer process is performed on the concerned Ethernet frame as a frame belonging to VLAN having identifier ID1 (VLAN-1) (step S420). Specifically, the transferring processor 131 specifies the sending port according to the first path information statically set in the MAC address tables 137 described while referring to FIG. 14, and performs Ethernet frame transfer. As a result, the concerned Ethernet frame is ultimately transferred to the collection device 200.

Meanwhile, when it is judged that the concerned Ethernet frame does not have abnormal marking (step S410: No), transfer process is performed with the concerned Ethernet frame as a frame belonging to VLAN having identifier ID0 (VLAN-0) (step S430). Specifically, the transferring processor 131 specifies the sending port according to the second path information which is normal path information in the MAC address tables 137 described while referring to FIG. 13, and performs transfer of the Ethernet frame. As a result, the concerned Ethernet frame is ultimately transferred to the device having the MAC address described as the destination MAC address.

The operation of the collection device 200 is the same as with the embodiment, so its description is omitted here.

With this Variation described above, even with a switching system for layer 2 transfer, the same as with the embodiment, if possibly abnormal traffic (Ethernet frame) is detected, it is possible to divert the concerned traffic instantaneously to the collection device 200. Also, abnormal marking is done for the COS field, so there is no wasting of bandwidth. Also, optimal placement of the collection device 200 can be easily realized. It is also not necessary to set a filter (with this embodiment, the ACL table 136) for all the switching devices 100, so it is possible to effectively utilize the resources of the switching device.

Note that with this Variation, in addition to the COS field, it is also possible to do abnormal marking on other fields describing the destination MAC, the source MAC address, and the VLAN-ID address for the Ethernet header. When the item in Ethernet header is rewritten, it is possible to have cases, when Ethernet frames judged by the collection device 200 to not be abnormal, the flames may not be returned to the original route. For example, there are cases when the switching system for layer 2 transfer is a system that uses so-called MAC in MAC technology that further adds another Ethernet header to Ethernet frames transferred from outside, and uses the newly added Ethernet head within the system. In this case, by referencing the original Ethernet header, Ethernet frames judged not to be abnormal by the collection device 200 are returned to the original route, so it is also possible to do abnormal marking on fields that describe the destination MAC address, the source MAC address, and the VLAN-ID for the newly added Ethernet header.

Figure 16:
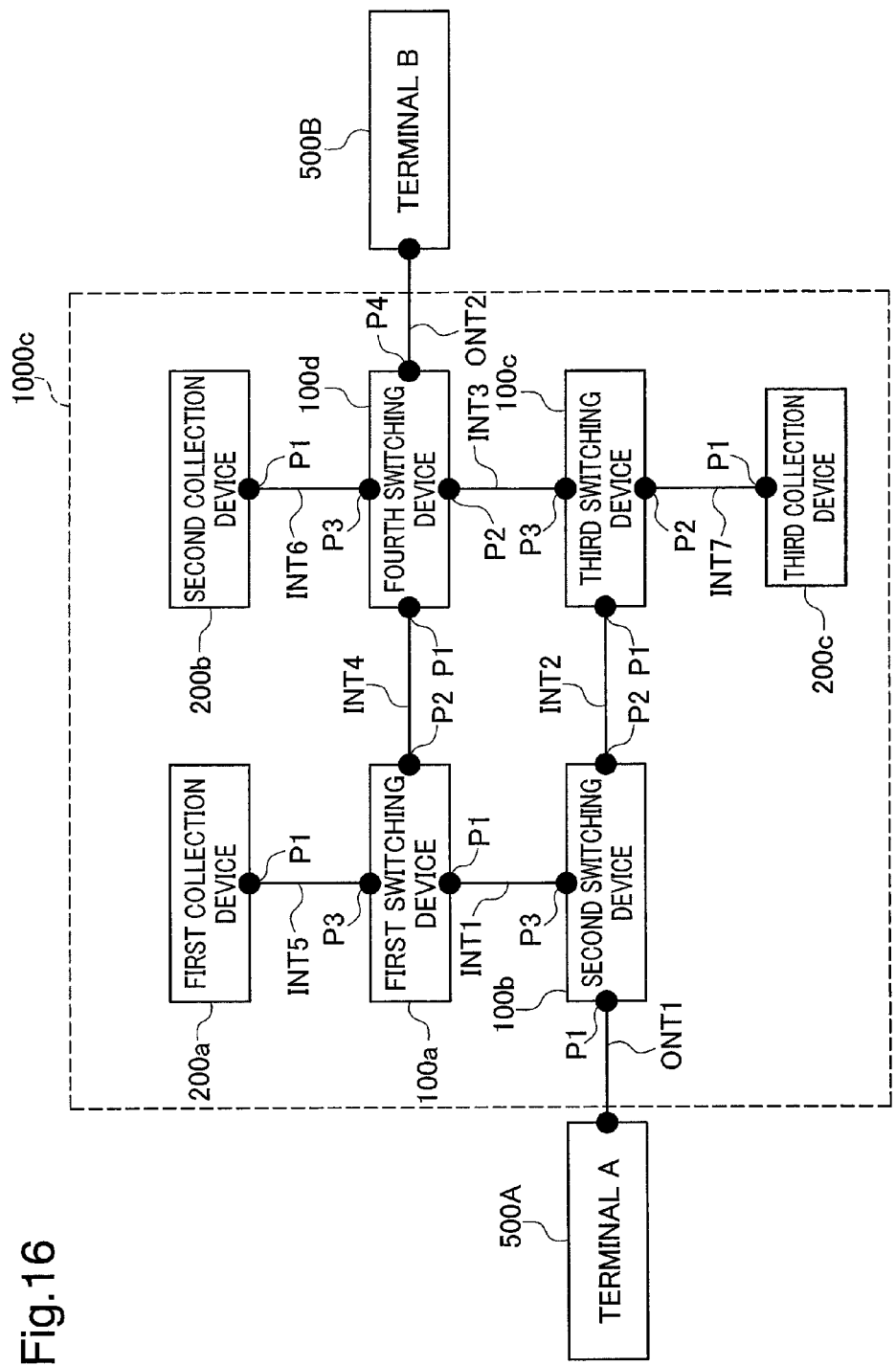
FIG. 16 is a block diagram showing the schematic constitution of the switching system of the fifth Variation.
Figure 19:
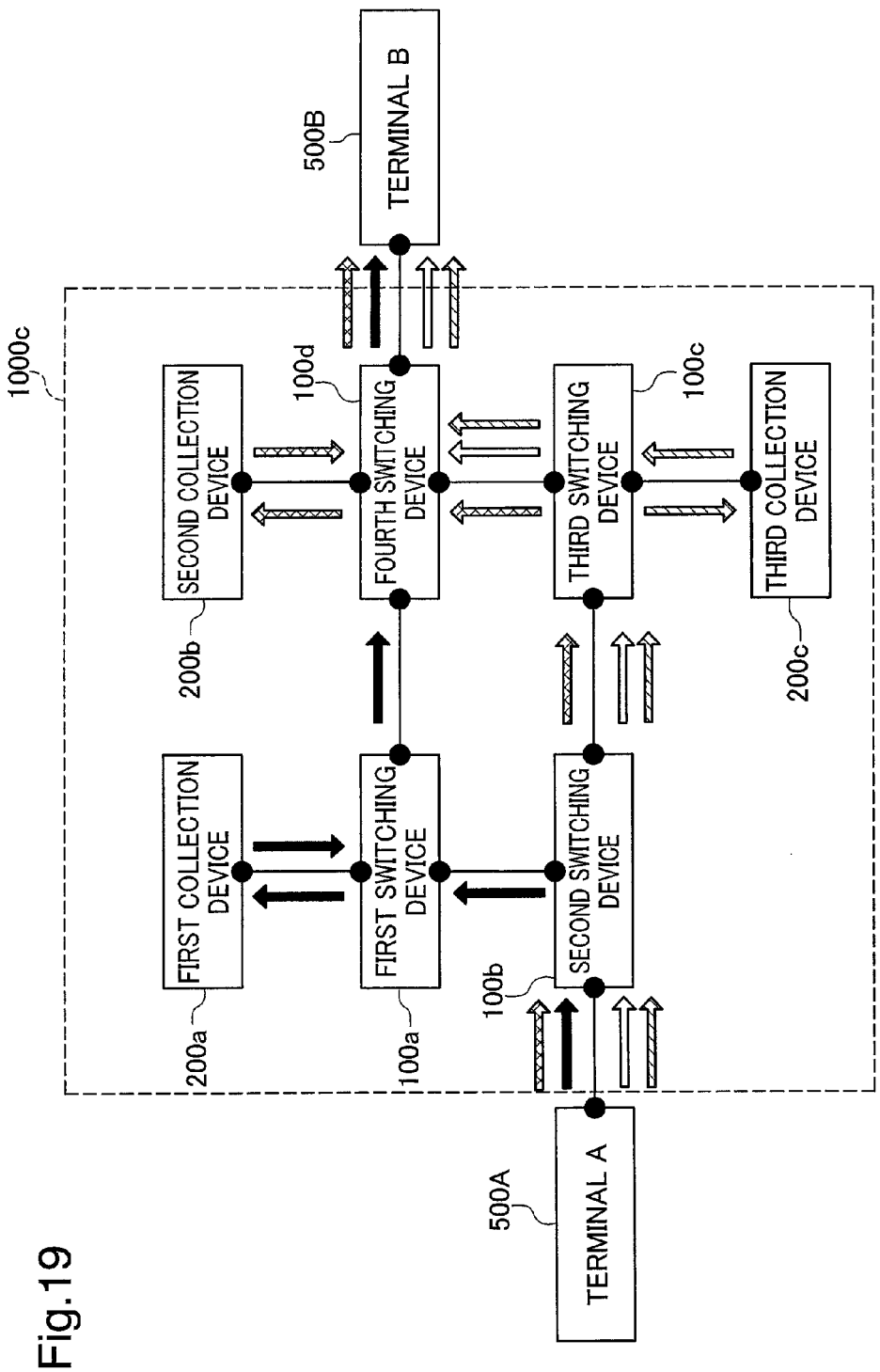
FIG. 19 is a drawing showing an operating example of the switching system of the fifth Variation.

Fifth Variation:

With the embodiment and Variations noted above, only one collection device is included in the switching system. However, it may be also possible to equip a plurality of collection devices. As an example, referring to FIG. 16 to FIG. 19, a system equipped with three collection devices will be described. FIG. 16 is a block diagram showing the schematic constitution of the switching system of the fifth Variation. FIG. 17 is a drawing conceptually showing the routing table stored in each switching device with the fifth Variation. FIG. 18 is a drawing conceptually showing an example of the ACL table stored in each switching device with the fifth Variation. FIG. 19 is a drawing showing an operating example of the switching system of the fifth Variation.

As shown in FIG. 16, the switching system 1000*c* of this Variation includes four switching devices, specifically, the first switching device 100*a*, the second switching device 100*b*, the third switching device 100*c*, and the fourth switching device 100*d*. The switching system 1000*c* further includes three collection devices, specifically, the first collection device 200*a*, the second collection device 200*b*, and the third collection device 200*c*. The basic constitution and operation of each switching device and collection device is the same as with the embodiment, so the description is omitted here.

As shown in FIG. 16, with the switching system 1000*c*, the port P1 of the second switching device 100*b* is connected with the system external terminal 500A (terminal A) via the outside network ONT1. Similarly, the port P4 of the fourth switching device 100*d* is connected with the system external terminal 500B (terminal B) via the outside network ONT2. The first switching device 100*a* port P1 and the second switching device 100*b* port P3, the second switching device 100*b* port P2 and the third switching device 100*c* port P1, the third switching device 100*c* port P3 and the fourth switching device 100*d* port P2, and the first switching device 100*a* port P2 and the fourth switching device 100*d* port P1 are respectively connected via internal networks INT1, INT2, INT3, and INT4.

Also, the first collection device 100*a* port P1 and the first switching device 100*a* port P3, the second collection device 200*b* port P1 and the fourth switching device 100*d* port P3, and the third collection device 200*c* port P1 and the third switching device 100*c* port P2 are respectively connected via internal networks INT5, INT6, and INT7.

Next, referring to FIG. 17, the contents of the routing table 135 stored in each switching device 100 with this Variation will be described. The routing tables stored in the first switching device 100a, the second switching device 100b, the third switching device 100c, and the fourth switching device 100d are respectively expressed using codes 135a, 135b, 135c, and 135d. As shown in FIG. 17, the same as with the embodiment, the routing tables 135a, 135b, and 135c include first path information and second path information. The same as with the embodiment, the second path information is normal path information described so that transfer is ultimately done to the device having the destination IP address, and is described as path information for VPN having identifier ID "0". The same as with the embodiment, the first path information is special path information described so that the concerned Ethernet frames are transferred to the collection device regardless of the destination IP address. In contrast to the embodiment, the first path information includes three types of path information. The three types of path information are path information for transferring Ethernet frames to the first collection device 200a, path information for transferring to the second collection device 200b, and path information for transferring to the third collection device 200c, and these are described respectively as path information for VPN having identifier ID "1," "2," and "3". The same as with the embodiment, the first path information, for example, is statically set by the system administrator.

Next, referring to FIG. 18, the ACL tables of this Variation are described. With this Variation, these tables are set in the second switching device 100b, the third switching device 100c, and the fourth switching device 100d. In FIG. 18, shown are the ACL tables 136b, 136c, and 136d respectively set in the second switching device 100b, the third switching device 100c, and the fourth switching device 100d. The same as with the embodiment, described in the ACL tables 136b, 136c, and 136d are rules for determining the Ethernet frames which are possibly abnormal, and the fact that abnormal marking is performed when the rules are matched. Here, respectively different rules are described in each ACL table 136b, 136c, and 136d. Also, in contrast to the embodiment, with this Variation, a plurality of types of abnormal marking, specifically, marking 1 through 3 are used. The three types of abnormal marking can be any of the types noted in the aforementioned embodiment and Variations, and are acceptable as long as each switching device 100 is possible to identify that these types of abnormal marking are respectively different markings. With this Variation, as the abnormal marking, marking 1 is noted in the ACL table 136b, marking 3 is noted in the ACL table 136c, marking 2 is noted in the ACL table 136d.

Operation of the Switching system of this Variation:
Abnormal Marking Process:

With this Variation, as can be seen from the ACL tables shown in FIG. 18, the second switching device 100b, the third switching device 100c, and the fourth switching device 100d can put abnormal marking on the Ethernet frames. If the second switching device 100b judges that the received Ethernet frames match the marking conditions, the second switching device 100b puts marking 1 on them. If the second switching device 100b judges that the received Ethernet frames match the marking conditions, the second switching device 100b puts marking 1 on them. If the third switching device 100c judges that the received Ethernet frames match the marking conditions, the third switching device 100c puts marking 3 on them. If the fourth switching device 100d judges that the received Ethernet frames match the marking conditions, the fourth switching device 100d puts marking 2 on them.

Transfer Process:

With this Variation, in each switching device 100a to 100d, when the concerned Ethernet frame does not have abnormal marking, the same as with the embodiment, the transferring processor 131 performs transfer process as the frame belonging to the VPN having identifier ID0 (VPN-0). As a result, the concerned Ethernet frame is routed so as to be ultimately transferred to the device having the IP address described as the destination IP address in the concerned Ethernet frame according to the second path information.

Meanwhile, with this Variation, in each switching device 100a to 100d, when the concerned Ethernet frame has abnormal marking, the transferring processor 131 performs transfer process according to one of the three types of path information included in the first path information corresponding to the type of abnormal marking. Specifically, when the concerned Ethernet frame has marking 1, the transferring processor 131 performs transfer process as the frame belonging to VPN having identifier ID1 (VPN-1). When the concerned Ethernet frame has marking 2, the transferring processor 131 performs transfer process as the frame belonging to VPN having identifier ID2 (VPN-2). Also, when the concerned Ethernet frame has marking 3, the transferring processor 131 performs transfer process as the frame belonging to VPN having identifier ID3 (VPN-3). As a result, Ethernet frames having marking 1 are routed so as to be transferred ultimately to the first collection device 200a, Ethernet frames having marking 2 ultimately to the second collection device 200b, and Ethernet frames having marking 3 ultimately to the collection device 200c.

Specific Operating Example:

To make this easier to understand, an operating example of the switching system 1000c is described referring to FIG. 19. As an operating example, a case when the frame P having the destination IP address IP_B is sent from the terminal 500A to the terminal 500B is described. In FIG. 19, the white arrows indicate the transfer route when normal routing is performed without matching the abnormal marking conditions for any of the second switching device 100b, the third switching device 100c, and the fourth switching device 100d. In this case, the frame P is sent ultimately to the terminal B without being marked at all.

In FIG. 19, the black arrows indicate the transfer route when the abnormal marking conditions are matched in the second switching device 100b with respect to the frame P. In this case, marking 1 is putted on the frame P in the second switching device 100b. As a result, as shown in FIG. 19, the frame P is transferred as a frame belonging to VPN-1 from the second switching device 100b to the first collection device 200a via first switching device 100a. Then, when the first collection device 200a judges that the frame P is not an abnormal frame, the marking 1 is removed from the frame P. As a result, the frame P is ultimately sent as a frame belonging to VPN-0 from the first collection device 200a via the first switching device 100a and the fourth switching device 100d to the terminal B.

In FIG. 19, the single hatch marked arrows indicate the transfer route when the frame P matches the abnormal marking conditions in the third switching device 100c. In this case, the marking 3 is putted on the frame P in the third switching device 100c. As a result, as shown in FIG. 19, the frame P is transferred as a frame belonging to VPN-3 from the third switching device 100c to the third collection device 200c. Then, when the third collection device 200c judges that the frame P is not an abnormal frame, the marking 3 is removed from the frame P. As a result, the frame P is sent ultimately as a frame belonging to VPN-0 from the third collection device 200c via the third switching device 100c and the fourth switching device 100d to the terminal B.

In FIG. 19, the cross hatched arrows indicate the transfer route when the frame P matches the abnormal marking conditions in the fourth switching device 100d. In this case, the marking 2 is putted on the frame P in the fourth switching device 100d. As a result, as shown in FIG. 19, the frame P is transferred as a frame belonging to VPN-2 from the fourth switching device 100d to the second collection device 200b. Then, when the second collection device 200b judges that the frame P is not an abnormal frame, the marking 2 is removed from the frame P. As a result, the frame P is ultimately sent as a frame belonging to VPN-0 from the second collection device 200b via the fourth switching device 100d to the terminal B.

In the switching system 1000c of the fifth Variation described above, data that is possibly abnormal is dispersed to the three collection devices 200a to 200c, and at the three collection devices, an inspection is done of whether or not it is abnormal data. As a result, it is possible to disperse the load of inspecting whether or not this is abnormal data to the three collection devices 200a to 200c. Also, respectively different ACL tables are set in the three switching devices 100b, 100d, and 100c. As a result, it is possible to disperse the load of the filtering process for determining whether or not abnormality is possible to the three switching devices 100b, 100d, and 100c.

Even when the ACL table 136 uses three types of markings 1 to 3, it is not absolutely necessary to set these in the three switching devices 100, and it may also possible to set in one switching device 100. FIG. 20 is a drawing conceptually showing a different example of the ACL table for the switching system of the fifth Variation. In this example, the ACL table is set only in the second switching device 100b. In this case, the second switching device 100b makes a judgment regarding the abnormal marking conditions described in the three ACL tables shown in FIG. 18, and may make the three types of marking 1 to 3 on the concerned Ethernet frames.

Sixth Variation:

In the aforementioned embodiment, the frames which are possibly abnormal are diverted to the collection device to execute the process of inspecting whether they are abnormal or not, but the invention is not limited to this, and the invention may be used to divert frames subject to another specific process (frames constituting specific traffic) to the collection device. For example, it may be possible to use a constitution that diverts frames that are subject to authentication processing to the collection device. For example, the ACL table 136 is set in any of the switching devices 100 so as to mark the frame which destination thereof is the network requiring authentication for access (authentication required network). Specifically, It may be possible to describe the ACL table 136 so as to mark frames having the network address of authentication required networks as the destination IP address. By doing this, the frame attempting to access the authentication required network is transferred to the collection device 200. Then, the collection device 200 may have an authentication server function. The collection device 200 may remove the marking from the authenticated frames and transfer the authenticated frames to the authentication required network. The collection device 200 may discard the frames that were not authenticated.

Other Variations:

In the aforementioned embodiment and Variations, the MAC address is used as the data link layer address, and the IP address is used as the network layer address, but this is because the network that connects each of the devices uses Ethernet™ as the data link layer protocol, and IP (internet protocol) is used as the network layer protocol. Of course, when using other protocols as the data link layer and the network layer protocols, the address for those protocols may be used. In this case, the transferred data may not be an Ethernet frame, may be data used in other data link layer protocol.

In the aforementioned embodiment, by handling the Ethernet frames marked as abnormal as frames belonging to a different VPN from the normal Ethernet frames, they are transferred to the collection device 200, and with the aforementioned fourth Variation, by handling the Ethernet frames marked as abnormal as frames belonging to a different VLAN from the normal Ethernet frames, they are transferred to the collection device 200, but by using existing technology called VPN and VIAN for this, this is to increase the compatibility with existing switching devices. The invention is not limited to this, and normal frames can also be transferred to destinations specified by destination information (in the case of layer 3 transfer, the destination IP address, and in the case of layer 2 transfer, the destination MAC address), and the frames marked as abnormal can be contrived to be transferred to the collection device 200.

In the aforementioned embodiment, the collection device 200 includes the function of checking the frames that are possibly abnormal and inspecting whether or not they are abnormal, but the collection device 200 can also be a device only for possibly abnormal frames being collected therein. For example, the collection device 200 may transfer the collected frames that are possibly abnormal to dedicated devices for inspecting whether or not they are abnormal.

With the aforementioned embodiment, the collection device 200 only discards frames judged to be abnormal, but instead of this, or in addition to this, it is also possible to perform various processes. For example, it is also possible to do feedback of the information of frames judged to be abnormal to each switching device 100, and thereafter for frames of the same contents, to discard them at each switching device 100.

In the aforementioned embodiment, the determination of whether or not abnormality is possible is performed by the ACL table 136 and the filtering processor 132, but this kind of determination may be performed by other known various types of filtering technology. For example, Ethernet frames having the same destination IP address can be determined to be possibly abnormal when there is a specified flow volume or greater with respect to such frames.

Part of the functions actualized by the hardware structure in the above embodiment may be attained by the software configuration. On the contrary, part of the functions attained by the software configuration in the above embodiment may be actualized by the hardware structure.

While the present invention have been shown and described on the basis of the embodiment and variations, the embodiment and variations described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A switching system for transferring data, the data including destination information specifying a destination, the switching system comprising:
a data collection device of a plurality of data collection devices in which first data is collected, the first data being subject to specific processing among the data; and
a plurality of switching devices directly or indirectly connected to the data collection device,
wherein at least one of the plurality of switching devices comprises:
a determination module that determines whether received data is the first data or is second data, the second data not being subject to the specific processing; and
a marking module that puts a first marking on the received data determined to be the first data,
wherein each of the plurality of switching devices comprises:
a storage that stores first path information and second path information indicating a transfer destination of the received data; and
a transferring processor that executes a first transfer process for sending the received data to the data collection device, based on the first path information, when the received data has the first marking, and a second transfer process that sends the received data to the specified destination, based on the second path information, when the received data does not have the first marking,
wherein the first data is data which is possibly abnormal,
wherein the specific process is process of determining whether or not the first data is abnormal,
wherein the data collection device comprises an inspection module that inspects the gathered first data and determines whether or not the first data is abnormal,
wherein the data collection device removes the first marking from the first data determined not to be abnormal and sends the first data determined not to be abnormal to any one of the plurality of switching devices, and
wherein the data collection device removes the first marking from the first data determined not to be abnormal and also puts a second marking on the first data determined not to be abnormal, the second marking indicating that data having the second marking is not abnormal;
wherein the first path information includes a plurality of types of path information to transfer data to each of the data collection devices;
wherein a plurality of types of the first marking corresponding to the plurality of types of path information included in the first path information are used, wherein the transferring processor, among the plurality of types of path information, references path information corresponding to the first marking type on the received data to execute the first process.

2. A switching system according to claim 1, wherein the first path information is set statically.

3. A switching system according to claim 1,
wherein the plurality of switching devices are layer 3 switches, and
wherein the transferring processor executes the first transfer process and the second transfer process by handling data having the first marking and data not having the first marking as data belonging to different virtual private networks.

4. A switching system according to claim 3, wherein the first marking is put on a network layer header.

5. A switching system according to claim 3, wherein the first marking is put on a data link layer header.

6. A switching system according to claim 1,
wherein the plurality of switching devices are layer 2 switches, and
wherein the transferring processor executes the first transfer process and the second transfer process by handling data having the first marking and data not having the first marking as data belonging to different virtual local area networks.

7. A switching system according to claim 6,
wherein the first marking is put on a data link layer header.

8. A method for transferring data in a switching system, the data including destination information specifying the destination, the system including a data collection device in which first data is collected, the first data being subject to specific processing among the data, and a plurality of switching devices directly or indirectly connected to the data collection device, the method comprising:
determining, by at least one of the plurality of switching devices, whether received data is the first data or is second data, the second data not being subject to the specific processing; and
putting, by the at least one of the plurality of switching devices, a first marking on the received data determined to be the first data;
storing, by each of the plurality of switching devices, first path information and second path information indicating a transfer destination of the received data;
executing, by each of the plurality of switching devices, a first transfer process for sending the received data to the data collection device, based on the first path information, when the received data has the first marking; and
executing, by each of the plurality of switching devices, a second transfer process that sends the received data to the specified destination, based on the second path information, when the received data does not have the first marking,
wherein the first data is data which is possibly abnormal,
wherein the specific process is process of determining whether or not the first data is abnormal;
inspecting, by the data collection device, the collected first data to determine whether or not the first data is abnormal;
removing, by the data collection device, the first marking from the first data determined not to be abnormal;
sending, by the data collection device, the first data determined not to be abnormal to any one of the plurality of switching devices; and
putting, by the data collection device, a second marking on the first data determined not to be abnormal, the second marking indicating that data having the second marking is not abnormal;
wherein the first path information includes a plurality of types of path information to transfer data to each of the data collection devices;
wherein a plurality of types of the first marking corresponding to the plurality of types of path information included in the first path information are used, and
wherein the first transfer process is executed referencing, among the plurality of types of path information, path information corresponding to the first marking type of the received data.

9. A method according to claim 8, wherein the first path information is set statically.

10. A method according to claim 8,
wherein the plurality of switching devices are layer 3 switches, and
wherein the first transfer process and the second transfer process are executed by handling data having the first marking and data not having the first marking as data belonging to different virtual private networks.

11. A method according to claim 10, wherein the first marking is put on a network layer header.

12. A method according to claim 10, wherein the first marking is put on a data link layer header.

13. A method according to claim 8,
wherein the plurality of switching devices are layer 2 switches, and
wherein the first transfer process and the second transfer process are executed by handling data having the first marking and data not having the first marking as data belonging to different virtual local area networks.

14. A method according to claim 13, wherein the first marking is put on a data link layer header.

* * * * *